US012808987B2

(12) United States Patent
Römhild et al.

(10) Patent No.: US 12,808,987 B2
(45) Date of Patent: Nov. 24, 2026

(54) METHOD FOR DETERMINING RADAR TRANSMISSION AND REFLECTION CHARACTERISTICS

(71) Applicant: Aptiv Technologies AG, Schaffhausen (CH)

(72) Inventors: Torsten Römhild, Düsseldorf (DE); Roberto Leonardi, Nuremberg (DE); Armin Talai, Nuremberg (DE)

(73) Assignee: Aptiv Technologies AG, Schaffhausen (CH)

( * ) Notice: Subject to any disclaimer, the term of this patent is extended or adjusted under 35 U.S.C. 154(b) by 205 days.

(21) Appl. No.: 18/883,776

(22) Filed: Sep. 12, 2024

(65) Prior Publication Data

US 2025/0130314 A1 Apr. 24, 2025

(30) Foreign Application Priority Data

Oct. 20, 2023 (EP) .................................... 23204832

(51) Int. Cl.
*G01S 7/41* (2006.01)
*G01S 13/02* (2006.01)

(52) U.S. Cl.
CPC ................ *G01S 7/41* (2013.01); *G01S 13/02* (2013.01)

(58) Field of Classification Search
CPC .................................. G01S 7/41; G01S 13/02
USPC .......................................................... 342/173
See application file for complete search history.

(56) References Cited

U.S. PATENT DOCUMENTS

2009/0128393 A1* 5/2009 Stjernman ............ H01Q 17/001 342/4

FOREIGN PATENT DOCUMENTS

CN 114004109 A 2/2022
WO WO-2019198448 A1 * 10/2019 ........... G01S 13/931

OTHER PUBLICATIONS

Fitzek et al, "Automotive Radome Design—Reflection Reduction of Stratified Media," IEEE Antennasandwirelesspropagationletters,vol. 8,2009 (Year: 2009).*

(Continued)

*Primary Examiner* — Samarina Makhdoom
(74) *Attorney, Agent, or Firm* — Harness, Dickey & Pierce, P.L.C.

(57) ABSTRACT

A method is provided for determining radar transmission and reflection characteristics of a vehicle component in proximity to a radar system. A parameter sweep array including input data sets is defined, each input data set including array elements which cover a range of a respective predefined parameter associated with the vehicle component. A reflection coefficient is calculated for radar waves transmitted by the radar system for each array element of the input data sets and for predefined angles with respect to a surface of the vehicle component. For each input data set and for each predefined angle, a respective worst-case element is determined having a maximum value of the reflection coefficient. A worst-case data set including the worst-case elements is generated for each input data set and for the predefined angles in order to provide a validation of the transmission and reflection characteristics of the vehicle component.

16 Claims, 8 Drawing Sheets

(56) References Cited

OTHER PUBLICATIONS

Gong et al. "Material Testing and Optimum Thickness Calculation for Automotive Millimeter Wave Radar Radome," 021 International Conference on Microwave and Millimeter Wave Technology (ICMMT) | 978-1-6654-3437-9/21/$31.00 © 2021 IEEE | DOI: 10.1109/ICMMT52847.2021.9618351 (Year: 2021).*
Qamar et al, "An Ultra-Wide Band Radome for High-Performance and Dual-Polarized Radar and Communication Systems," IEEE Access vol. 8, 2020 (Year: 2020).*
Fitzek et al, "Comparison Of Matching Layers For Automotive Radome Design," Adv. Radio Sci., 8, 49-54, 2010 www.adv-radio-sci.net/8/49/2010/ doi: 10.5194/ars-8-49-2010 (Year: 2010).*
Dash et al. "A Model for Equivalent Loss Tangent of Multilayered Media for Automotive Radar Applications," 13th European Conference on Antennas and Propagation (EuCAP 2019) (Year: 2019).*
Extended European Search Report regarding European Patent Application No. 23204832.2, dated Apr. 11, 2024.
Fitzek F et al: "Automotive Radome Design—Reflection Reduction of Stratified Media,", IEEE Antennas and Wireless Propagation Letters, vol. 8, Jan. 1, 2009.
Qamar Zeeshan et al: "An Ultra-Wide Band Radome for High-Performance and Dual-Polarized Radar and Communication Systems," IEEE Access, vol. 8, Oct. 21, 2020.
Qamar Zeeshan et al: "An Accurate Method for Designing, Characterizing, and Testing a Multi-Layer Radome for mm-Wave Applications," IEEE Access, vol. 8, Jan. 29, 2020.

* cited by examiner

600

METHOD FOR DETERMINING RADAR TRANSMISSION AND REFLECTION CHARACTERISTICS

CROSS-REFERENCE TO RELATED APPLICATIONS

This application claims the benefit and priority of European patent application number EP 23204832.2, filed on Oct. 20, 2023. The entire disclosure of the above application is incorporated herein by reference.

FIELD

This section provides background information related to the present disclosure which is not necessarily prior art.

The present disclosure relates to a method for determining radar transmission and reflection characteristics of a vehicle component being located in proximity to a radar system installed in a vehicle.

BACKGROUND

When integrating a radar system in a vehicle, the radar system is mostly located behind a vehicle component like a cover or a fascia in order to fulfil requirements regarding the vehicle design and to make the radar system optically invisible. The vehicle component, i.e. the cover or the fascia, which is arranged in front of the radar system should be as transparent as possible for radio frequency waves which are transmitted and received by the radar system. Therefore, such vehicle components like covers or fasciae are usually of plastic as a carrier material and are often provided with some additional complex stack of layers, e.g. as designed elements.

Vehicle components made of plastic which are located in front of the radar system increase the noise of signals provided by the radar system since such plastic vehicle components may enable complex multiple-scattering or multi-bounce paths for the radar waves. The impact of the vehicle component, e.g. of the cover or of the fascia, on the reflectivity of the radar waves depends on the dielectric permittivity and on the thickness of the respective layers constituting the vehicle component, which may also be related to each other. The reflectivity of the vehicle component regarding the radar waves depends on a jump of the dielectric permittivity at the surface of the vehicle component and/or at an interface between the layers if the vehicle component includes a stack of different layers.

In order to ensure a proper operation of an integrated and covered radar system within the vehicle, a position of the radar system may be simulated with respect to an internal environment of the vehicle. Simulation models for radar systems consider the body in white or chassis of the vehicle, a bracket of the radar system and, in addition, the covering vehicle component like the fascia including the stack of layers. For current standard processes of radar integration in vehicles, the position of the radar system, position tolerances and a specific, predefined stack of layers of the covering vehicle component are considered with a specified worst-case coating defining the stack of layers.

For the integration of a radar system in a vehicle, it is very important to consider such worst-case coatings or paintings of the vehicle component covering the radar system and to determine a worst-case response of the entire stack of layers constituting the vehicle component since such a worst-case response may be regarded as a reference which guarantees that the radar system is likely to work with a proper performance for all further coatings or paintings, e.g. colors, and tolerances regarding e.g. the dielectric permittivity and the thickness of the respective layers.

When considering the worst-case stack of layers for a vehicle component like a cover or fascia, known methods do not include tolerances for parameters of the individual layers properly, e.g. for the dielectric permittivity and for the thickness of each of the layers constituting the vehicle component covering the radar system. Hence, the resulting transmission and reflection properties provided e.g. by simulating an assumed worst-case scenario for the vehicle component do therefore not reflect the true material behavior when using the known methods or approaches. In some cases, for example, the known methods and approaches may provide a reflectivity being too high or too low for certain angle ranges in comparison to a real worst-case reflectivity determined under consideration of respective tolerances for the parameters of each layer. As a result, the known methods and approaches may not succeed in defining a real worst-case regarding the transmission and the reflectivity of a stack of layers under consideration for a vehicle component covering a radar system.

Accordingly, there is a need to have a method for determining radar transmission and reflection characteristics which is able to accurately and reliably define a worst-case scenario for a vehicle component.

SUMMARY

This section provides a general summary of the disclosure, and is not a comprehensive disclosure of its full scope or all of its features.

The present disclosure provides a computer implemented method, a computer system and a non-transitory computer readable medium according to the independent claims. Embodiments are given in the subclaims, the description and the drawings.

In one aspect, the present disclosure is directed at a computer implemented method for determining radar transmission and reflection characteristics of a vehicle component being located in proximity to a radar system installed in a vehicle. According to the method, a parameter sweep array including a plurality of input data sets is defined, wherein each input data set includes array elements which cover a range of a respective one of a set of predefined parameters associated with the vehicle component. A respective reflection coefficient of the vehicle component is determined or calculated for radar waves transmitted by the radar system for each array element of the input data sets and for a set of angles covering a predefined angle range with respect to a surface of the vehicle component. For each input data set and for each of the set of angles, a respective worst-case element is determined which has a maximum value of the reflection coefficient. A worst-case data set including the worst-case elements is generated for each input data set and for each of the set of angles in order to provide a validation of the radar transmission and reflection characteristics of the vehicle component.

The set of predefined parameters for which a respective range is covered by a respective one of the plurality of input data sets may include design and material parameters of the vehicle component like a thickness, a dielectric permittivity and/or a lost tangent of the vehicle component. If the vehicle component includes a stack of different layers, the predefined parameters may be defined for each of the layers separately. Therefore, each layer of the vehicle component may be associated with respective parameters like the thickness, the dielectric permittivity and/or the loss tangent of the respective layer.

For each of the predefined parameters of the vehicle component or of the respective layers, the range to be covered by the respective input data set may be defined by expected tolerances of the respective parameters. In addition, environmental conditions like temperature range, moisture range and a range for ultraviolet radiation may further be considered when defining the plurality of input data sets covering the ranges for the respective parameters.

When generating the worst-case data set by determining respective worst-case elements, the array elements of the respective input data set are "swept" over the range of the parameter which is associated with this input data set. Therefore, the plurality of input data sets constitutes the parameter sweep array on which the calculation of respective reflection coefficients of the vehicle component is based.

Via the worst-case data set, the transmission and reflection characteristics of the vehicle component are validated over the ranges of the entire set of predefined parameters and for the entire predefined angle range by calculating worst-case elements for the respective ranges. Therefore, the worst-case data set may be a basis for providing true transmission and reflection characteristics of the vehicle component over its manufacturing tolerances and its life time.

One advantage of the method is that it provides an accurate and reliable worst-case scenario regarding the radar reflection characteristics of the vehicle component under consideration. This worst-case scenario is provided by the method based on a plurality of ranges for the predefined parameters associated with the vehicle component and for the predefined angle range which may be an entire relevant range of incident angles with respect to the surface of the vehicle component. In contrast, known methods mostly provide an optimization of a vehicle component or a stack of layers associated with such a vehicle component for an incident angle of 0 ° only.

The accurate and reliable knowledge regarding the worst-case scenario of the radar reflection of the vehicle component may support and improve the integration of radar systems within the vehicle. In addition, the worst-case scenario regarding the radar reflection may also be considered when defining safety functions for a vehicle which includes the radar system and the vehicle component.

Since the reflection coefficient is estimated for the input data sets covering ranges of parameters of the vehicle component and for a predefined incident angle range, a statistical analysis may be performed in addition to selecting the worst-case elements of the worst-case data set. Based on a result of such a statistical analysis, a portion of rejects may be estimated for the vehicle component if a mass production of the vehicle component may be intended.

According to an embodiment, a nominal value may be provided for each of the set of predefined parameters, and the range of the respective ones of the set of predefined parameters may be defined by an upper limit and a lower limit with respect to the respective nominal value. The nominal value may be an expected or mean value for the respective parameter of the vehicle component which may be intended for a mass production. Such a mean value may be derived from experience with former mass productions, for example. The upper limit and the lower limit of the respective range of the predefined parameters may be arranged symmetrically with respect to the nominal value, e.g. by determining a standard deviation sigma with respect to the nominal value and by defining the respective difference of the upper limit and the lower limit, respectively, with respect to the nominal value via a multiple of the standard deviation, e.g. 3 sigma or 6 sigma.

The range for each of the respective parameters may therefore be defined by the nominal value and a respective tolerance range with respect to the nominal value. In addition, respective reflection coefficients may be determined for the respective nominal values of the parameters of the vehicle component, and a standard deviation may be determined regarding the reflection coefficient with respect to the nominal value for each of the parameters. Based on such standard deviations of the reflection coefficient determined for each of the parameters, a further statistical analysis may be derived in order to determine the values which might be relevant for a mass production of the vehicle component.

According to a further embodiment, the vehicle component may include a stack of layers, and the respective reflection coefficient of the vehicle component may be determined by calculating the reflection and the transmission of radar waves with consideration of each of the respective layers and with consideration of interactions of the radar waves between the respective layers. For example, the vehicle component may include a plastic carrier or substrate on which a primer, different color paintings and a clear coat may be applied. Considering the radar reflection and transmission as well as the interactions of the transmitted and reflected radar waves for each of respective layers may increase the accuracy of the worst-case scenario of the vehicle component, i.e. the accuracy of the worst-case elements having the maximum value of the reflection coefficient.

The radar waves reflected and transmitted by the stack of layers belonging to the vehicle component may be a superposition of the radar waves being transmitted and reflected at the surface of the vehicle component, i.e. at the first layer, and at interfaces between all further layers. In addition, the absorption of radar waves may be considered.

The range of respective ones of the set of predefined parameters may be defined separately for each layer. Hence, the flexibility when determining the worst-case scenario may be increased.

The predefined parameters may include a dielectric permittivity and a thickness for each of the respective layers. Since the reflectivity of the radar waves is determined by the respective jump of the dielectric permittivity at the respective interface between the layers and at the surface of the vehicle component, the dielectric permittivity may be one of the most important parameters for defining the worst-case scenario for the vehicle component. The same may be valid for the thickness of the respective layers.

The predefined parameters may further include a loss tangent and the surface roughness for each of the respective layers. Additionally or alternatively, the predefined parameters may further include an aging factor and environmental conditions of the vehicle component. The environmental conditions may include a temperature range, a moisture range and an ultraviolet range which may be regarded as relevant for the lifetime of the vehicle component. The consideration of additional parameters, i.e. in addition to the dielectric permittivity and the thickness for each of the respective layers, may further increase the accuracy when determining the worst-case data set for the vehicle component.

According to a further embodiment, calculating the respective reflection coefficient of the vehicle component may include performing an analytic simulation of radar waves emitted by the radar system and being reflected by the vehicle component. Performing the analytic simulation of the radar waves may reduce the computational effort required for the method.

The worst-case data set may further include a respective transmission coefficient associated with to the respective worst-case element having the maximum value of the reflection coefficient. For determining the respective transmission coefficient, the absorption of the radar waves by the vehicle component may also be considered. In detail, the power of the transmitted radar waves may be determined by the power of the incident radar waves minus the power of the reflected radar waves and minus the power of the absorbed radar waves. Including the respective transmission coefficients in the worst-case data set may facilitate and support the use of the output of the method.

The angle range may include a range of an azimuth angle and a range of an elevation angle with respect to the surface of the vehicle component. The azimuth angle and the elevation angle may refer to an axis extending perpendicularly to the surface of the vehicle component. Hence, the azimuth angle and the elevation angle may define an incident angle of the radar waves for the vehicle component. Accordingly, the worst-case data set may be determined for each angular step within the range of the azimuth angle and the range of the elevation angle for radar waves being transmitted into e.g. a stack of layers constituting the vehicle component. The ability to determine the worst-case data set for each azimuthal and elevational angular step within their ranges may be a clear benefit with respect to known methods for determining a worst-case scenario of the transmission and reflection characteristics. In addition, the consideration of both azimuth and elevation angles may further increase the flexibility and the accuracy of the method when determining the worst-case data set.

According to a further embodiment, determining the respective reflection coefficient of the vehicle component for each element of the input data set and for the set of angles may be performed for each of a set of predefined frequencies of radar waves separately. For each of the set of predefined frequencies, a respective worst-case data set may be generated which may include the worst-case elements having the maximum value of the reflection coefficient for each input data set and for each of the set of angles. In other words, the method may be performed repeatedly for frequencies of the radar waves which may be regarded as relevant for the application of the radar system within a vehicle. Considering different frequencies may increase the flexibility when using the results provided by the method.

Similarly, determining the respective reflection coefficient of the vehicle component for each array element of the input data sets and for the set of angles may be performed for each of at least two different polarizations of radar waves separately. For each of the different polarizations, a respective worst-case data may be generated which may include the worst-case elements having the maximum value of the reflection coefficient for each input data set and for each of the set of angles. Considering different polarization may also increase the flexibility when using the results provided by the method.

The worst-case data set may be applied to generate a look-up table for a three-dimensional simulation of the radar transmission and reflection characteristic of the vehicle component. Instead of performing the huge number of three-dimensional simulations for different parameters of the vehicle component, only one or a small number of three-dimensional simulations may be performed in order to assess the radar transmission and reflection characteristics or properties of the vehicle component. Hence, the computational effort for such an assessment may be drastically reduced. An algorithm for the three-dimensional simulation may be able to process the worst-case data set provided by the method directly via the look-up table.

According to a further embodiment, the vehicle component may be associated with an artificial stack of layers. Values of the respective ones of the sets of predefined parameters may be defined separately for each layer of the artificial stack, and the respective reflection coefficient may be iteratively estimated for the artificial stack of layers for each element of the input data sets and for the set of angles. The values of the respective ones of the set of predefined parameters may be varied during the iterative estimation until, for final values of the predefined parameters, a deviation of the reflection coefficient of the layers of the artificial stack with respect to the worst-case data set may be minimized. Moreover, the artificial stack of layers having the final values of the parameters may be used in a three-dimensional simulation of the radar transmission and reflection characteristics of the vehicle component.

In contrast to the direct use of the worst-case data set, e.g. by a representation as a look-up table for the three-dimensional simulation, the artificial stack of layers may be applied for this embodiment and the parameters of the layers of the artificial stack may be varied until the deviation of the reflection coefficient with respect to the worst-case data set is minimized, e.g. by reaching a value for the deviation which is below a predetermined threshold. This may be used as a convergence criterion which may indicate that the reflection coefficient of the artificial stack of layers is as close as possible to a desired reflection coefficient which may be provided based on the worst-case data set.

Therefore, the artificial stack of layers having the final values of the parameters and having the minimum deviation with respect to the worst-case data set may be used as a realistic approximation of the vehicle component associated with the worst-case data set. Applying the artificial stack of layers having the final values of the parameters in the three-dimensional simulation may therefore also provide realistic results for the radar characteristics of the vehicle component, i.e. as an alternative to the direct use of the worst-case data set as a look-up table. This may be valid for such algorithms performing the three-dimensional simulation which are not able to use the worst-case data set directly.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

As used herein, terms like processor, processing unit and module may refer to, be part of, or include an Application Specific Integrated Circuit (ASIC), an electronic circuit, a combinational logic circuit, a Field Programmable Gate Array (FPGA), a processor (shared, dedicated, or group) that executes code, other suitable components that provide the described functionality, or a combination of some or all of the above, such as in a system-on-chip. The processor or processing unit may include memory (shared, dedicated, or group) that stores code executed by the processor. Moreover, the processor or processing unit may include a central processing unit (CPU) or a Graphics Processing Unit (GPU)

may both be suitable for performing the method according to the disclosure as described above.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Exemplary embodiments and functions of the present disclosure are described herein in conjunction with the following drawings, showing schematically:

Corresponding reference numerals indicate corresponding parts throughout the several views of the drawings.

DETAILED DESCRIPTION

Example embodiments will now be described more fully with reference to the accompanying drawings.

Figure 1:
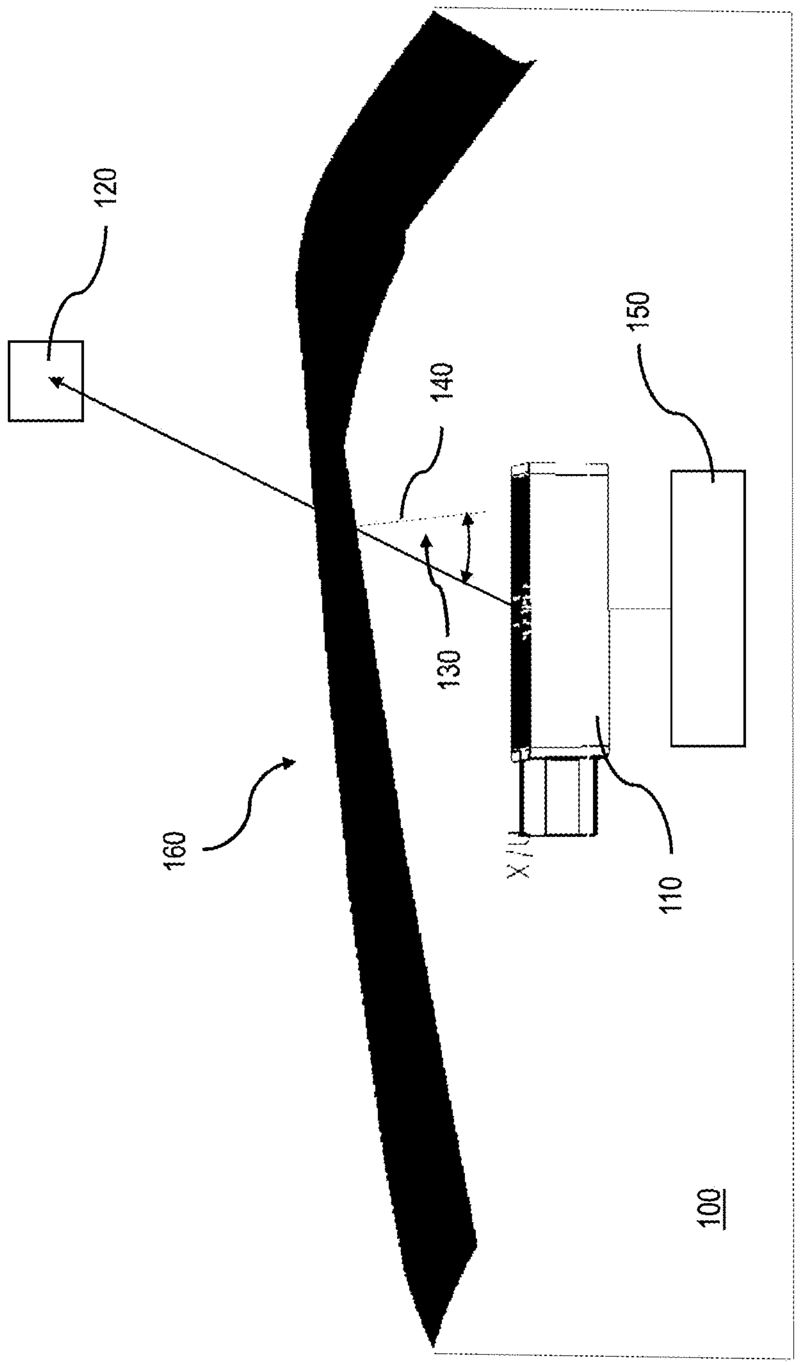
FIG. 1 is an illustration of a vehicle including a radar system which is mounted behind a fascia of the vehicle.

FIG. 1 schematically depicts a vehicle 100 including a radar system 110 which is configured to detect an object 120 in the external environment of the vehicle 100. The radar system 110 is configured to transmit radar waves and to receive radar waves which are reflected at the object 120. The radar system 110 is configured to determine a range or distance and a range rate of the object 120 with respect to the radar system 110 and the vehicle 100, as well as a direction-of-arrival, i.e. an azimuth angle or an azimuth/elevation angle pair, for the reflected radar waves with respect to a longitudinal axis of the vehicle. In order to analyze data representing the transmitted and reflected radar waves, the radar system 110 is connected to a processing unit 150 of the vehicle 100.

Within the vehicle 100, the radar system 110 is mounted behind and close to a further vehicle component which is a fascia 160 in the present example. As will be discussed in detail below, the fascia 160 influences the radar waves which are transmitted by the radar system 110 and the radar waves which are reflected by the object 120 and received by the radar system 110. The influence or impact of the fascia 160 may therefore disturb the results when analyzing the signals provided by the radar system 110. For example, the fascia 160 may add noise in signals provided by the radar system 110 since the fascia may enable complex multi-bounce paths for the radar waves transmitted by the radar system 110. An incident angle 130 is defined with respect to a surface of the fascia 160 for the radar waves transmitted by the radar sensor 110. In detail, the incident angle 130 is defined with respect to a vertical line 140 extending perpendicularly to the surface of the fascia 160. The incident angle 130 includes an azimuth angle and an elevation angle defined in a plane parallel and perpendicularly, respectively, to a ground plane on which the vehicle 100 is located.

Figure 2:
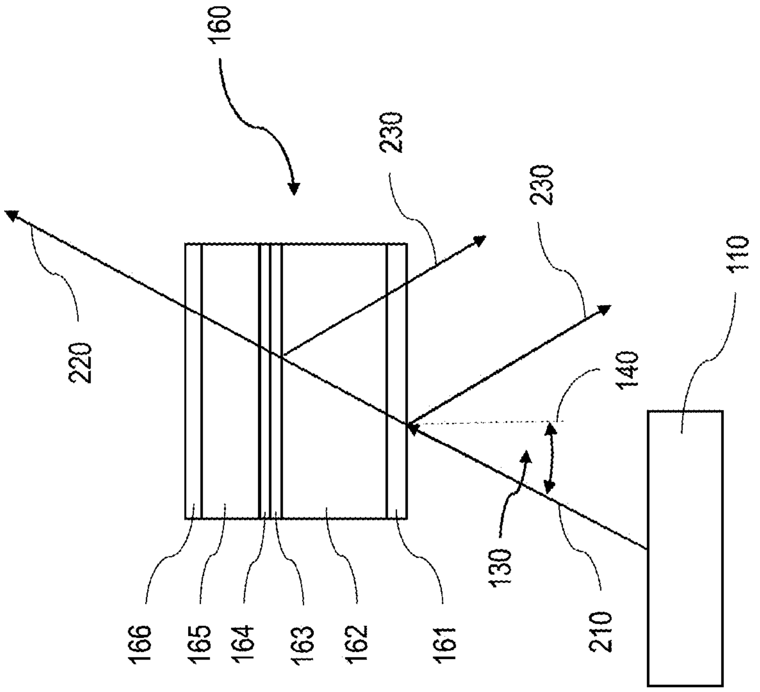
FIG. 2 is an illustration of a vehicle component including a stack of layers and radar waves being transmitted or reflected by the vehicle component.

FIG. 2 depicts the radar system 110 together with the vehicle component or fascia 160 which is configured a as stack of N different layers. In the example as shown in FIG. 2, the fascia 160 includes a stack of six layers 161 to 166. These layers may include a first layer 161, a second layer 162, a third layer 163, a fourth layer 164, a fifth layer 165 and a final layer 166, for example. The different layers 161 to 166 may differ with respect to the thickness and also with respect to the dielectric permittivity of the layers which is indicated in FIG. 2, although the respective thicknesses of the layers 161 to 166 are not shown with a realistic scale. For example, the layers 161, 163, 164 and 166 may have a thickness in a range from 1 to about 10 μm, whereas the layers 162 and 165 may have a thickness in a range between 1 and 4 or 5 mm. However, the method according to the disclosure is not restricted to these particular examples and may also be applied to a vehicle component like the fascia 160 which has a completely different internal structure.

The radar system 110 transmits radar waves 210 which arrive at the vehicle component 160, i.e. at a surface of the first layer 161, at the incident angle 130 which is shown with a respect to the line 140 being perpendicular to the surface of the vehicle component 160 or the first layer 161 (see also FIG. 1). The radar waves 210 partly pass through the entire vehicle component 160. This is represented by the transmitted radar waves 220. A further part of the incident radar waves 210 is reflected as a respective one of the layers 161 to 166. For sake of simplicity, reflected radar waves 230 are depicted for a first layer 161 and the third layer 163 only. However, it is to be understood that the incident radar waves 210 are reflected at each of the respective layers 161 to 166, and the respective reflected radar waves interact with each other and with the incident radar waves 210 within each of the layers 161 to 166. Therefore, the reflected radar waves 230 are in fact a superposition of the incident radar waves 210 with the radar waves which are reflected at the surface of the vehicle component and at each interface between the respective layers 161 to 166. The transmitted radar waves 210 are a similar superposition of the incident radar waves 210 and the radar waves reflected at each of the layers 161 to 166. Moreover, the absorption of the radar waves is also considered for each layer 161 to 166.

For the vehicle component 160 including the stack of layers 161 to 166, it is important to consider a worst-case scenario regarding the transmission and reflection characteristics since such a worst-case scenario provides a reference to ensure that the radar system 110 shows a proper performance e.g. for all kinds of paintings or layer combinations and their tolerances regarding properties if a mass production of the vehicle component 160 is intended. For known methods of identifying a worst-case scenario for the vehicle component 160, a worst-case coating is considered which includes a plastic carrier material or substrate as a main layer and for which nominal values of parameters are defined for the plastic carrier and for additional layers located on top of or below the plastic carrier. However, tolerances for each of the layers 161 to 166 regarding their respective thickness, dielectric permittivity and further properties or parameters like surface roughness, isotropy, environmental conditions and aging effects are not considered by the known methods of identifying the worst-case scenario. In addition, known methods usually provide a worst-case scenario which may be valid for a range of incident angles close to zero degrees only.

Therefore, the transmission and reflection characteristics provided by the known method do not reflect the true material behavior of the vehicle component and its layers 161 to 166, and they are therefore not able to properly identify the worst-case scenario regarding the reflection of radar waves. Instead, for example, in some cases angle ranges with a higher reflectivity and in other cases angle ranges with a lower reflectivity in comparison to the true material behavior may be provided by the known methods. In summary, the known methods do not provide a real worst-case scenario regarding the material definition and the radar transmission and reflection characteristics of the vehicle component 160.

Figure 3:
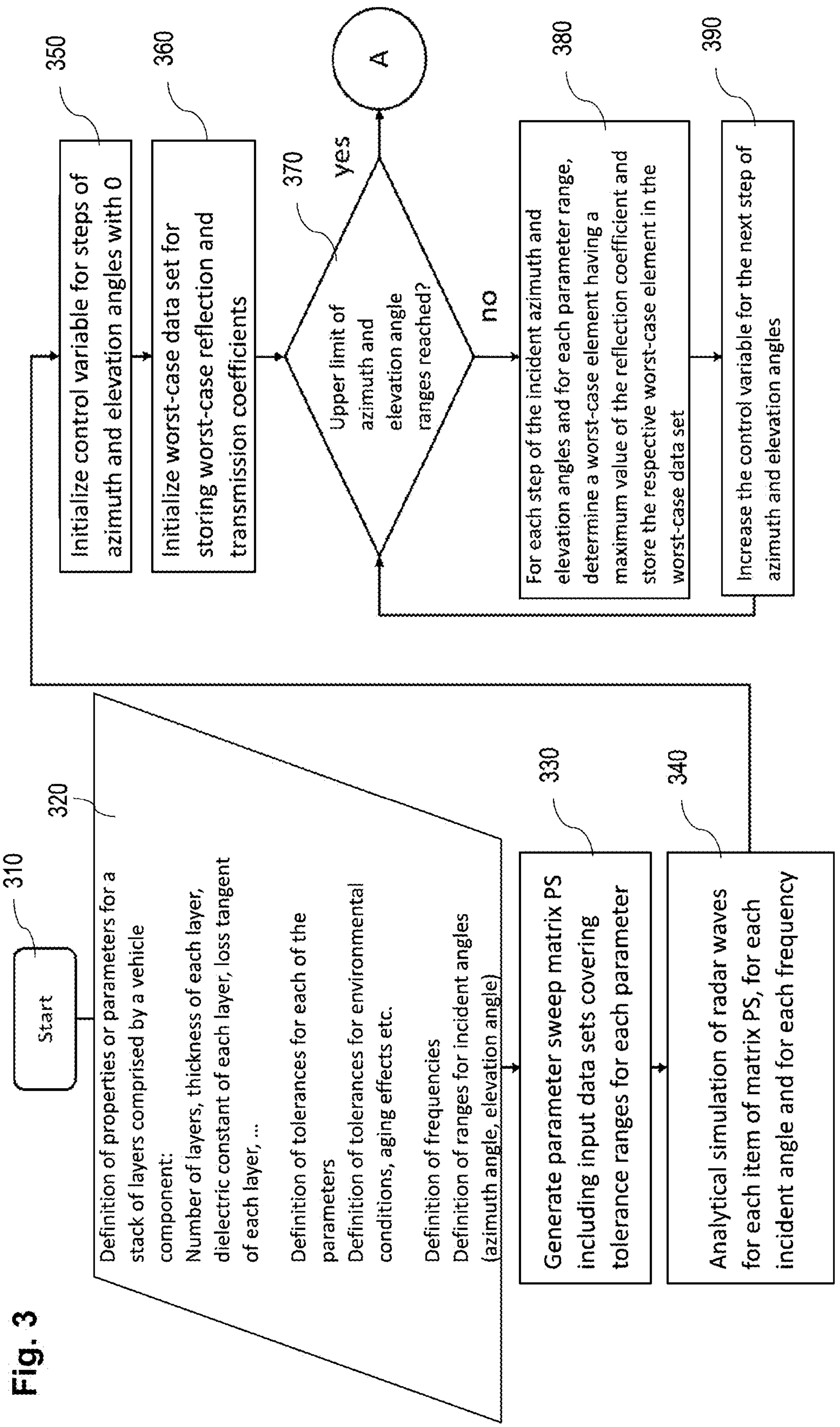
FIG. 3 is a detailed flow diagram of a method according to the disclosure.

In order to provide an accurate definition of the worst-case scenario for the vehicle component 160 with respect to the radar transmission and reflection characteristics, a method according to the disclosure is provided which is schematically depicted in FIG. 3. After starting the method at 310, properties for parameters are defined for a stack of layers, e.g. the stack of layers 161 to 166 as shown in FIG. 2, comprised by the vehicle component 160. The parameters include a number of layers, a thickness of each layer, a dielectric permittivity of each layer, a loss tangent of each layer, and an isotropy of each layer, for example. In addition, tolerances or ranges are defined for each of the parameters which are relevant for the respective vehicle component 160 which may be intended for a mass production. The tolerances are provided for each layer.

Moreover, tolerances are defined for environmental conditions, e.g. by defining a temperature range, a moisture range, an ultraviolet range relevant for the vehicle component and/or for each layer. In addition, tolerances or ranges are defined for aging effects and/or a surface roughness for each layer. Moreover, radar frequencies are defined which are relevant for operating the radar system 110 within the vehicle 100 (see FIG. 1). Finally, ranges are defined for incident angles, e.g. for the incident angle 130 (see FIGS. 1 and 2), of the radar waves with respect to the surface of the vehicle component 160. A respective range is defined for the azimuth angle and for the elevation angle which are relevant for the practical use of the radar system 110 when installed within the vehicle behind the vehicle component or fascia 160.

At 330, a parameter sweep array or parameter sweep matrix PS is generated which includes a plurality of input data sets associated with the respective parameters as defined at 320. Each input data set covers a respective tolerance range as defined at 320 for a respective one of the sets of predefined parameters which is also defined at 320 and associated with the vehicle component 160. In other words, the matrix PS covers all tolerances defined at 320 for the properties or parameters of the stack of layers 161 to 166 (see FIG. 2) comprised by the vehicle component 160.

At 340, an analytical simulation of the radar waves is performed for each item of the matrix PS, for each incident angle and for each frequency as also defined at 320. The analytical simulation of the radar waves results in reflection coefficients and corresponding transmission coefficients over all incident azimuth and elevation angles, i.e. for the entire range of incident angles as defined in 320, and for each of the set of frequencies as also defined at 320 and being regarded as relevant for the operation of the radar system 110.

At 350, a control variable is initialized for steps of the azimuth and elevation angles. The control variable is initialized with zero in order to start at a respective lower limit of the incident angle ranges, i.e. the ranges for the azimuth and elevation angles as defined at 320. At 360, a worst-case data set is initialized for storing the worst-case reflection and transmission coefficients which are determined based on the results of the analytical simulation of 340.

Elements of the worst-case data set are determined by performing a loop over the ranges for the incident angles, i.e. over the range of the azimuth angle and the range of the elevation angle, and over the respective tolerance range for each of the parameters as defined at 320. The loop includes the steps 370, 380 and 390.

Figure 4:
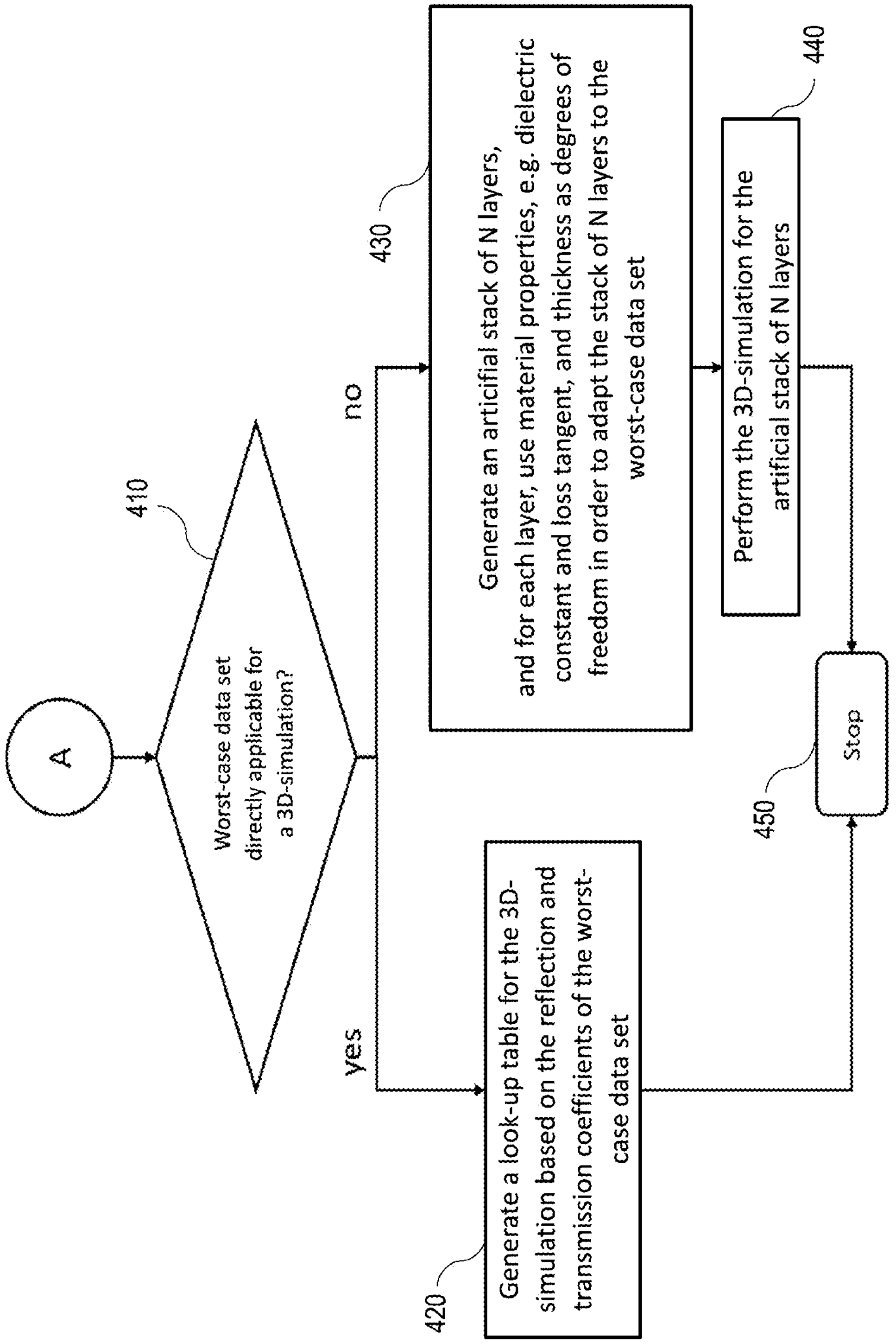
FIG. 4 is a flow diagram depicting further steps of the method according to the disclosure.

At 370, it is determined whether an upper limit of the range of the azimuth angle and the range of the elevation angle has been reached. If yes, the method proceeds at "A" which indicates the transition to the further method steps as depicted in FIG. 4. If no, a respective worst-case element having a maximum value of the reflection coefficient is determined at 380 for each step of the incident azimuth and elevation angle and for each parameter tolerance range as defined at 320.

In detail, a current step or value of the incident azimuth and elevation angles is set by the value of the control variable which has been initialized at 350, and for the current azimuth and elevation angle the tolerance range is scanned or swept for each parameter as defined at 320 in order to find the maximum value of the reflection coefficient. Thereafter, the respective worst-case element determined by scanning or sweeping the parameter tolerance range for the current azimuth and elevation angle is stored in the worst-case data set.

Thereafter, the control variable is increased at 390 in order to provide the next step of the azimuth and elevation angle within their predefined ranges. After the increase of the control variable at 390, the loop of the method turns back to 370 where it is checked again whether the upper limit of the azimuth and elevation angle ranges has been reached.

FIG. 4 depicts further steps of the method according to the disclosure. By these steps, the worst-case data set determined in the steps 350 to 390 of FIG. 3 is applied. Hence, "A" indicates the transition from the steps as shown in FIG. 3 to the steps as shown in FIG. 4.

At 410, it is determined whether the worst-case data set is directly applicable for a three-dimensional simulation of the radar transmission and reflection characteristics of the vehicle component 160. For example, it is checked whether the worst-case data set is compatible with the algorithm performing the three-dimensional simulation, i.e. whether the algorithm is able to read the worst-case data set, for example.

If yes, a look-up table (LUT) is generated for the three-dimensional simulation based on the reflection and transmission coefficient provided by the worst-case data set. In other words, the result provided by the worst-case data set is directly used at 420 in form of a look-up table for the three-dimensional simulation of the radar transmission and reflection characteristics of the vehicle component 160.

If no, i.e. if the worst-case data set is not directly applicable, an artificial stack of layers is generated at 430. The artificial stack includes a predefined number of N layers. For each layer, the material properties, i.e. the dielectric permittivity and the loss tangent, for example, and the respective thickness are used as a respective degree of freedom in order to adapt the artificial stack of N layers to the worst-case scenario for the vehicle component 160, i.e. to the worst-case data set as provided by the method steps of FIG. 3.

In detail, a respective reflection coefficient and the corresponding transmission coefficient are iteratively estimated for the artificial stack of N layers for the parameter ranges and for the incident angle ranges as defined at 320. As the degrees of freedom, the material properties and the thickness of the respective N layers are varied during the iterative estimation until a deviation of the reflection coefficient of the artificial stack of N layers with respect to the worst-case data set is below a predetermined threshold. By such an iteration, final values for the material properties and for the thickness of the respective one of the N layers are determined.

At 440, the three-dimensional simulation of the radar transmission and reflection characteristics of the vehicle component 160 is performed for the artificial stack of N layers which includes the final values for the parameters of each layer. As mentioned above, the final values are the result of the iteration with respect to the material properties and the thickness of each layer.

For both cases, i.e. when using the worst-case data set directly via a look-up table at 420 and when using the worst-case data set indirectly via generating the artificial stack of N layers at 430, only one three-dimensional simulation is required for estimating the radar transmission reflection behavior of the vehicle component 160 when incorporating the radar system 110 (see FIG. 1) into the vehicle 100.

Figure 5B:
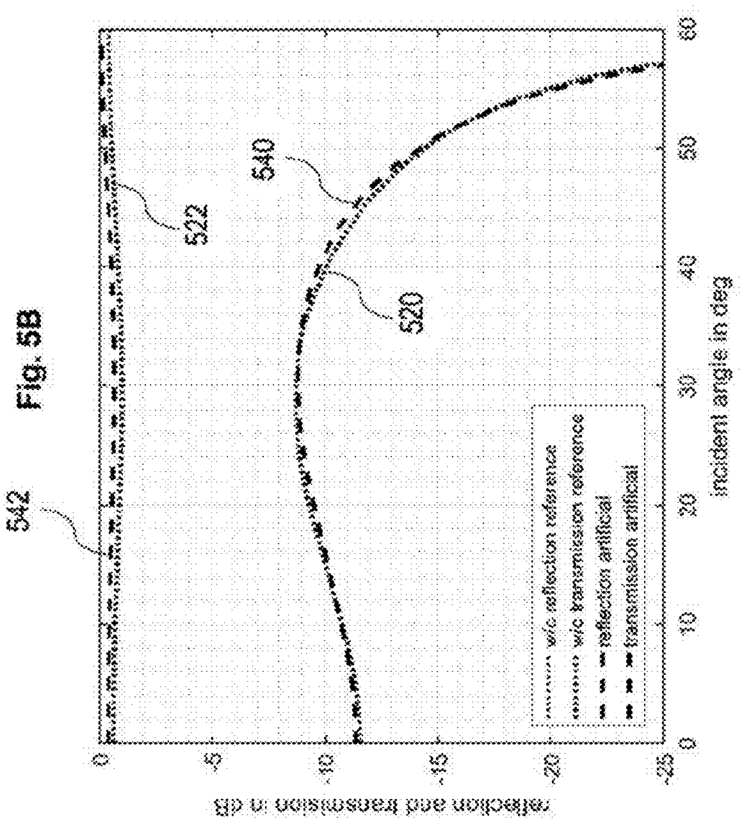
FIGS. 5A and 5B are illustrations of diagrams depicting reflection and transmission properties of a stack of layers.
Figure 5A:
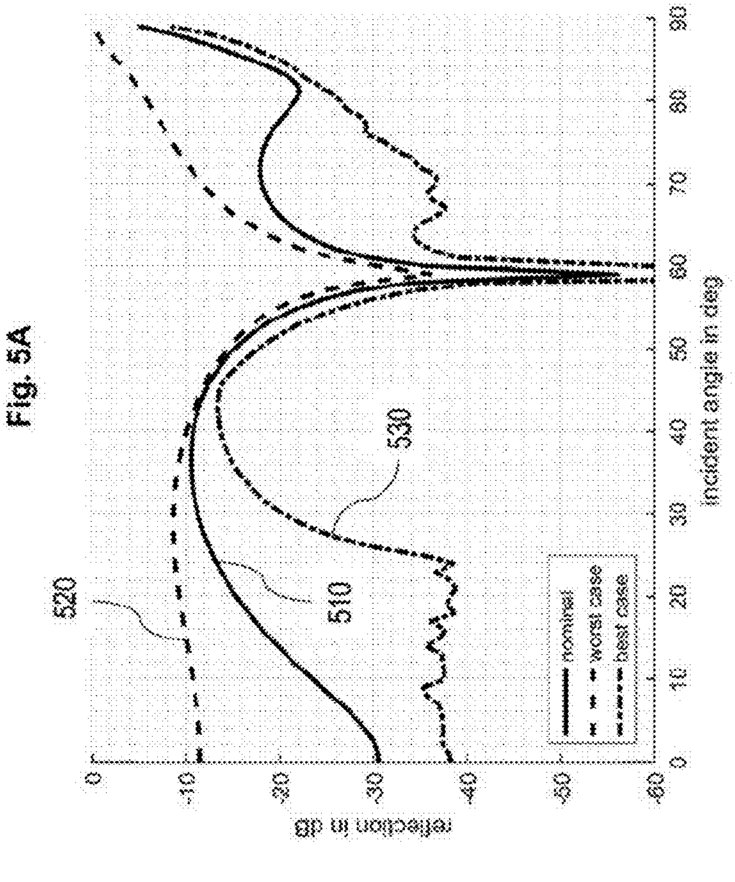

FIGS. 5A and 5B show diagrams which depict reflection properties (FIG. 5A) and reflection and transmission properties (FIG. 5B) for a stack of six layers as shown e.g. in FIG. 2. In FIG. 5A, the reflection in dB is depicted over an incident angle in degrees for the layer stack, whereas in FIG. 5B, the reflection and the transmission in dB is depicted over the incident angle in degrees.

In FIG. 5A, the curve 510 represented by the solid line shows the reflection in dB for a so-called nominal case, i.e. for nominal values of the parameters for each of the six layers, i.e. for the material properties like the dielectric permittivity and the loss tangent and for the thickness of the respective layers. Curve 520 represents the worst-case data set as provided by the method shown in FIG. 3, i.e. as an envelope over the respective maximum reflection coefficient for the respective incident angle when varying the respective parameters over their associated tolerance ranges. In addition, curve 530 shows the best-case scenario for the reflection coefficient for the respective incident angle, i.e. the respective minimum value of the reflection coefficient when the respective parameters of the stack of six layers are varied over the respective tolerance ranges. For determining the curves 520 and 530 of FIG. 5A, 262,000 values of the respective parameters have been considered. The incident angle referred to in FIGS. 5A and 5B represent a combined elevation and azimuth incident angle.

As can be seen in the angle range between 20 and 40 degrees in FIG. 5A, the curve 520 representing the worst-case scenario exceeds-10 dB. This has not been expected by the results of known methods for estimating the worst-case scenario for the stack of six layers.

In FIG. 5B, the curve 520 representing the worst-case scenario for the reflection is shown again for a restricted angle range, i.e. up to 60 degrees, as a dotted line. In addition, the corresponding transmission of the stack of six layers is represented by the curve 522 which is also shown as a dotted line. Moreover, curve 540 represents the reflection of an artificial stack of six layers generated as described above in context of step 430 in FIG. 4. The reflection of the artificial stack of six layers is shown as curve 540 which is depicted as a dashed line. Furthermore, the corresponding transmission of the artificial stack of six layers is represented by the curve 542 which is also depicted as a dashed line.

As can be recognized from the result as shown in FIG. 5B, the curves 540 and 542 calculated for the artificial stack of six layers having the final values for its parameters, i.e. the material properties and the respective layer thicknesses, show a good agreement with the respective curves 520 and 522 representing the worst-case data set. Hence, the artificial stack of layers may also be used for the above-described three-dimensional simulation such that it is expected that the three-dimensional simulation based on the artificial layer stack will provide reasonable results for the reflection and transmission characteristics of the vehicle component 160.

Figure 6:
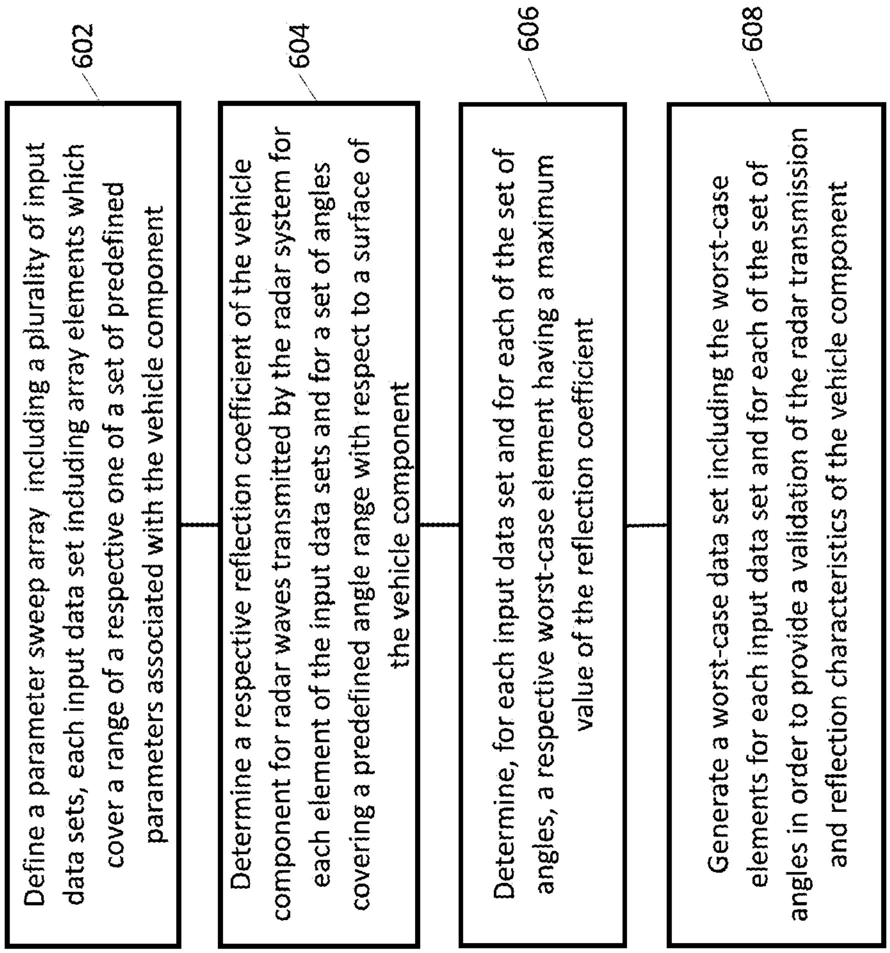
FIG. 6 is a flow diagram illustrating a method for determining radar transmission and reflection characteristics of a vehicle component being located in proximity to a radar system installed in a vehicle according to various embodiments.

FIG. 6 shows a flow diagram 600 illustrating a method for determining radar transmission and reflection characteristics of a vehicle component being located in proximity to a radar system installed in a vehicle. At 602, a parameter sweep array including a plurality of input data sets may be defined, each input data set including array elements which cover a range of a respective one of a set of predefined parameters associated with the vehicle component. At 604, a respective reflection coefficient of the vehicle component may be determined or calculated for radar waves transmitted by the radar systems for each array element of the input data sets and for a set of angles covering a predefined angle range with respect to a surface of the vehicle component. At 606, for each input data set and for each of the set of angles, a respective worst-case element may be determined having a maximum value of the reflection coefficient. At 608, a worst-case data set may be generated including the worst-case elements for each input data set and for each of the set of angles in order to provide a validation of the radar transmission and reflection characteristics of the vehicle component.

According to various embodiments, a nominal value may be provided for each of the set of predefined parameters, and the range of the respective ones of the set of predefined parameters may be defined by an upper limit and a lower limit with respect to the respective nominal value.

According to various embodiments, the vehicle component may include a stack of layers, and the respective reflection coefficient of the vehicle component may be determined by calculating the reflection and the transmission of radar waves with consideration of each of the respective layers and with consideration of interactions of the radar waves between the respective layers.

According to various embodiments, the range of the respective ones of the set of predefined parameters may be defined separately for each layer.

According to various embodiments, the predefined parameters may include a dielectric permittivity and a thickness for each of the respective layers.

According to various embodiments, the predefined parameters may further include a loss tangent and a surface roughness for each of the respective layers.

According to various embodiments, the predefined parameters may further include an aging factor and environmental conditions of the vehicle component.

According to various embodiments, determining the respective reflection coefficient of the vehicle component may include performing an analytic simulation of radar waves emitted by the radar sensor and being reflected by the vehicle component.

According to various embodiments, the worst-case data set may further include a respective radar transmission coefficient being associated with the respective worst-case element having the maximum value of the reflection coefficient.

According to various embodiments, the angle range may include a range of an azimuth angle and a range of an elevation angle with respect to the surface of the vehicle component.

According to various embodiments, determining the respective reflection coefficient of the vehicle component for each array element of the input data sets and for the set of angles may be performed for each of a set of predefined frequencies of radar waves separately, and for each of the set of predefined frequencies, a respective worst-case data set may be generated which includes the worst-case elements having the maximum value of the reflection coefficient for each input data set and for each of the set of angles.

According to various embodiments, determining the respective reflection coefficient of the vehicle component for each array element of the input data sets and for the set of angles may be performed for each of at least two different polarizations of radar waves separately, and for each of the different polarizations, a respective worst-case data set may be generated which includes the worst-case elements having the maximum value of the reflection coefficient for each input data set and for each of the set of angles.

According to various embodiments, the worst-case data set may be applied to generate a look-up table for a three-dimensional simulation of the radar transmission and reflection characteristics of the vehicle component.

According to various embodiments, the vehicle component may be associated with an artificial stack of layers, and values of the respective ones of the set of predefined parameters may defined separately for each layer of the artificial stack. A respective reflection coefficient may be iteratively estimated for the artificial stack of layers for each element of the input data sets and for the set of angles. The values of the respective ones of the set of predefined parameters may be varied during the iterative estimation until, for final values of the predefined parameters, a deviation of the reflection coefficients of the layers of the artificial stack with respect to the worst-case data set may be minimized. The artificial stack of layers having the final values of the parameters may be used in a three-dimensional simulation of the radar transmission and reflection characteristics of the vehicle component.

Each of the steps 602, 604, 606, 608 and the further steps described above may be performed by computer hardware components.

Figure 7:
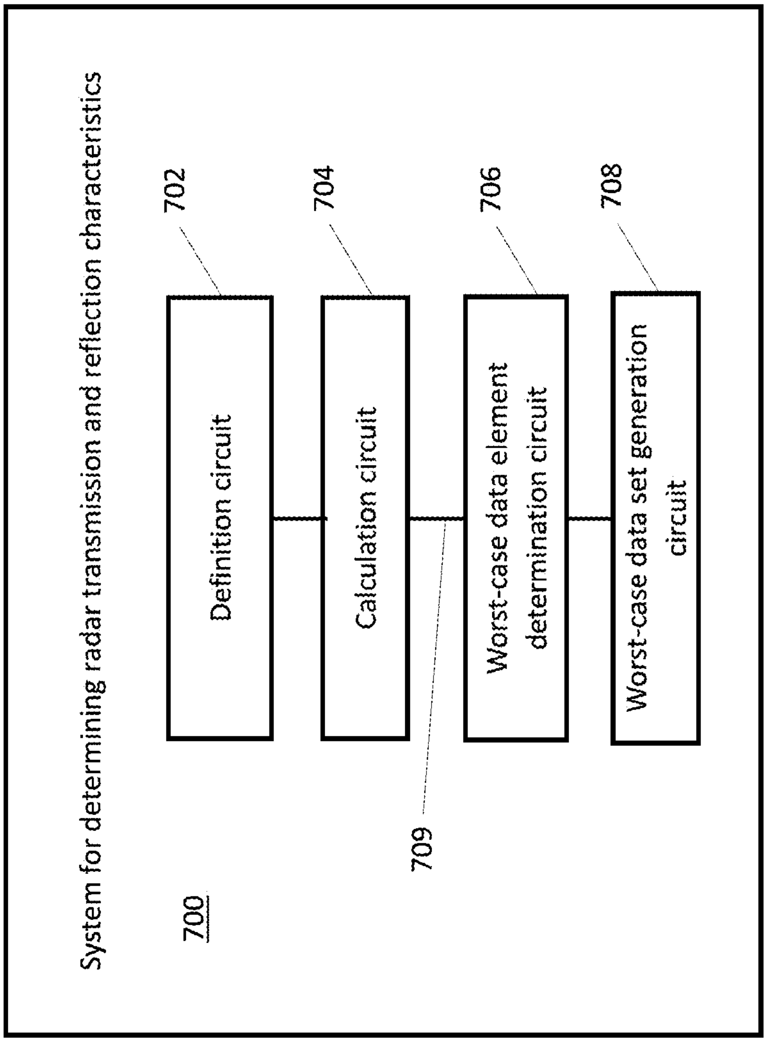
FIG. 7 is an illustration of a system according to various embodiments.

FIG. 7 shows a system 700 for determining radar transmission and reflection characteristics according to various embodiments. The system 700 may include a definition circuit 702, a calculation circuit 704, a worst-case data element determination circuit 706 and a worst-case data set generation circuit 708.

The definition circuit 702 may be configured to define a parameter sweep array including a plurality of input data sets, each input data set including array elements which cover a range of a respective one of a set of predefined parameters associated with the vehicle component.

The calculation circuit 704 may be configured to determine or calculate a respective reflection coefficient of the vehicle component for radar waves transmitted by the radar system for each element of the input data sets and for a set of angles covering a predefined angle range with respect to a surface of the vehicle component.

The worst-case data element determination circuit 706 may be configured to determine, for each input data set and for each of a set of angles, a respective worst-case element having a maximum value of the reflection coefficient.

The worst-case data set generation circuit 708 may be configured to generate a worst-case data set including the worst-case elements for each input data set and for each of the set of angles in order to provide a validation of the radar transmission and reflection characteristics of the vehicle component.

A "circuit" may be understood as any kind of a logic implementing entity, which may be special purpose circuitry or a processor executing a program stored in a memory, firmware, or any combination thereof.

Figure 8:
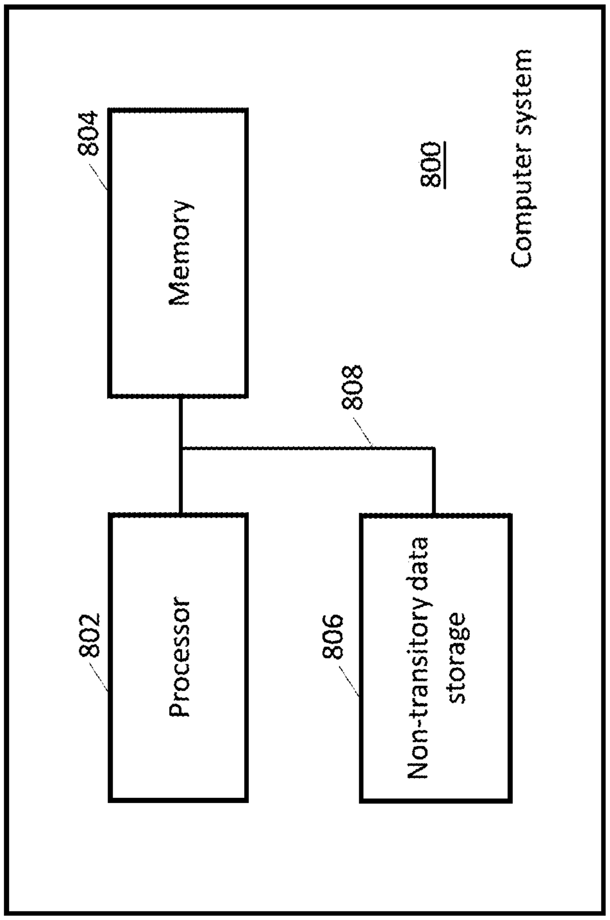
FIG. 8 is an illustration of a computer system with a plurality of computer hardware components configured to carry out steps of a computer implemented method as described herein.

FIG. 8 shows a computer system 800 with a plurality of computer hardware components configured to carry out steps of a computer implemented method for predicting respective trajectories of a plurality of road users according to various embodiments. The computer system 800 may include a processor 802, a memory 804, and a non-transitory data storage 806.

The processor 802 may carry out instructions provided in the memory 804. The non-transitory data storage 806 may store a computer program, including the instructions that may be transferred to the memory 804 and then executed by the processor 802.

The processor 802, the memory 804, and the non-transitory data storage 806 may be coupled with each other, e.g. via an electrical connection 808, such as e.g. a cable or a computer bus or via any other suitable electrical connection to exchange electrical signals.

As such, the processor 802, the memory 804 and the non-transitory data storage 806 may represent the definition circuit 702, the calculation circuit 704, the worst-case data element determination circuit 706 and the worst-case data set generation circuit 708, as described above.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the system 700 for determining radar transmission and reflection characteristics and/or for the computer system 800.

REFERENCE NUMERAL LIST

100 vehicle
110 radar system
120 object
130 incident angle
140 line perpendicular to the surface of the vehicle component
150 processing unit
160 vehicle component
161-166 layers of the vehicle component
210 radar waves transmitted by the radar system
220 radar waves transmitted by the vehicle component
230 reflected radar waves
310-390 method steps
410-450 method steps
510 curve for the reflection representing a nominal case
520 curve for the reflection representing a worst-case
522 curve for the transmission representing the worst-case
530 curve for the reflection representing a best case
540 curve for the reflection of an artificial stack of layers
542 curve for the transmission of the artificial stack of layers
600 flow diagram illustrating a method for determining radar transmission and reflection characteristics of a vehicle component being located in proximity to a radar system installed in a vehicle
602 step of defining a parameter sweep array including a plurality of input data sets, each input data set including array elements which cover a range of a respective one of a set of predefined parameters associated with the vehicle component
604 step of determining a respective reflection coefficient of the vehicle component for radar waves transmitted by the radar system for each array element of the input data sets and for a set of angles covering a predefined angle range with respect to a surface of the vehicle component
606 step of determining, for each input data set and for each of the set of angles, a respective worst-case element having a maximum value of the reflection coefficient
608 step of generating a worst-case data set including the worst-case elements for each input data set and for each of the set of angles in order to provide a validation of the radar transmission and reflection characteristics of the vehicle component
700 system for determining radar transmission and reflection characteristics
702 definition circuit
704 calculation circuit
706 worst-case data element determination circuit
708 worst-case data set generation circuit
709 connection
800 computer system according to various embodiments
802 processor
804 memory
806 non-transitory data storage
808 connection

What is claimed is:

1. A computer implemented method for determining radar transmission and reflection characteristics of a vehicle component being located in proximity to a radar system installed in a vehicle, the method comprising:

defining a parameter sweep array including a plurality of input data sets, each input data set including array elements which cover a range of a respective one of a set of predefined parameters associated with the vehicle component, determining a respective reflection coefficient of the vehicle component for radar waves transmitted by the radar system for each array element of the input data sets and for a set of angles covering a predefined angle range with respect to a surface of the vehicle component, for each input data set and for each of the set of angles, determining a respective worst-case element having a maximum value of the reflection coefficient, and generating a worst-case data set including the worst-case elements for each input data set and for each of the set of angles in order to provide a validation of the transmission and reflection characteristics of the vehicle component;

wherein:

the vehicle component includes a stack of layers;

the respective reflection coefficient of the vehicle component is determined by calculating the reflection and the transmission of radar waves with consideration of each of the respective layers and with consideration of interactions of the radar waves between the respective layers; and the range of the respective one of the set of predefined parameters is defined separately for each layer.

2. The method according to claim 1, wherein:

for each of the set of predefined parameters, a nominal value is provided, and the range of the respective ones of the set of predefined parameters is defined by an upper limit and a lower limit with respect to the respective nominal value.

3. The method according to claim 1, wherein:

the predefined parameters include a dielectric permittivity and a thickness for each of the respective layers.

4. The method according to claim 3, wherein:

the predefined parameters further include a loss tangent and a surface roughness for each of the respective layers.

5. The method according to claim 3, wherein:

the predefined parameters further include an aging factor and environmental conditions of the vehicle component.

6. The method according to claim 1, wherein:

determining the respective reflection coefficient of the vehicle component includes performing an analytic simulation of radar waves emitted by the radar system and being reflected by the vehicle component.

7. The method according to claim 1, wherein:

the worst-case data set further includes a respective radar transmission coefficient being associated with the respective worst-case element having the maximum value of the reflection coefficient.

8. The method according to claim 1, wherein:

the angle range includes a range of an azimuth angle and a range of an elevation angle with respect to the surface of the vehicle component.

9. The method according to claim 1, wherein:

determining the respective reflection coefficient of the vehicle component for each array element of the input data sets and for the set of angles is performed for each of a set of predefined frequencies of radar waves separately, and for each of the set of predefined frequencies, a respective worst-case data set is generated which includes the worst-case elements having the maximum value of the reflection coefficient for each input data set and for each of the set of angles.

10. The method according to claim 1, wherein:

determining the respective reflection coefficient of the vehicle component for each array element of the input data sets and for the set of angles is performed for each of at least two different polarizations of radar waves separately, and for each of the different polarizations, a respective worst-case data set is generated which includes the worst-case elements having the maximum value of the reflection coefficient for each input data set and for each of the set of angles.

11. The method according to claim 1, wherein:

the vehicle component is associated with an artificial stack of layers, values of the respective ones of the set of predefined parameters are defined separately for each layer of the artificial stack, a respective reflection coefficient is iteratively estimated for the artificial stack of layers for each element of the input data sets and for the set of angles, the values of the respective ones of the set of predefined parameters are varied during the iterative estimation until, for final values of the predefined parameters, a deviation of the reflection coefficients of the layers of the artificial stack with respect to the worst-case data set is minimized, and the artificial stack of layers having the final values of the parameters is used in a three-dimensional simulation of the radar transmission and reflection characteristics of the vehicle component.

12. A computer system configured to carry out the computer implemented method of claim 1.

13. A non-transitory computer readable medium comprising instructions for carrying out the computer implemented method of claim 1.

14. The method according to claim 1, wherein:

determining the respective reflection coefficient of the vehicle component includes performing an analytic simulation of radar waves emitted by the radar system and reflected by the vehicle component for each array element of the input data sets to generate the respective reflection coefficient and corresponding transmission coefficient for incident azimuth and elevation angles across the predefined angle range.

15. The method according to claim 1, further comprising:

in response to determining that the worst-case data set is compatible with a three-dimensional simulation of the radar transmission and reflection characteristics of the vehicle component, generating a look-up table for the three-dimensional simulation based on a reflection and transmission coefficient provided by the worst-case data set.

16. A computer implemented method for determining radar transmission and reflection characteristics of a vehicle component being located in proximity to a radar system installed in a vehicle, the method comprising:

defining a parameter sweep array including a plurality of input data sets, each input data set including array elements which cover a range of a respective one of a set of predefined parameters associated with the vehicle component, determining a respective reflection coefficient of the vehicle component for radar waves transmitted by the radar system for each array element of the input data sets and for a set of angles covering a predefined angle range with respect to a surface of the vehicle component, for each input data set and for each of the set of angles, determining a respective worst-case element having a maximum value of the reflection coefficient, generating a worst-case data set including the worst-case elements for each input data set and for each of the set of angles in order to provide a validation of the transmission and reflection characteristics of the vehicle component;

the vehicle component is associated with an artificial stack of layers, values of the respective ones of the set of predefined parameters are defined separately for each layer of the artificial stack, a respective reflection coefficient is iteratively estimated for the artificial stack of layers for each element of the input data sets and for the set of angles, the values of the respective ones of the set of predefined parameters are varied during the iterative estimation until, for final values of the predefined parameters, a deviation of the reflection coefficients of the layers of the artificial stack with respect to the worst-case data set is minimized, and the artificial stack of layers having the final values of the parameters is used in a three-dimensional simulation of the radar transmission and reflection characteristics of the vehicle component.

* * * * *